United States Patent
Garcia et al.

(10) Patent No.: US 10,983,094 B2
(45) Date of Patent: Apr. 20, 2021

(54) SENSOR AND USE THEREOF FOR MEASURING SPEED OF SOUND IN GASEOUS MEDIUM AND METHOD AND APPARATUS FOR MEASUREMENT OF VAPOUR SORPTION

(71) Applicant: SURFACE MEASUREMENT SYSTEMS LTD, London (GB)

(72) Inventors: Armando Garcia, Breinigsville, PA (US); Daryl Williams, Burnham (GB); Dirk Bruere, Bedford (GB); Sihe Wang, London (GB); Robert Price, Welwyn (GB)

(73) Assignee: SURFACE MEASUREMENT SYSTEMS LTD, London (GB)

( * ) Notice: Subject to any disclaimer, the term of this patent is extended or adjusted under 35 U.S.C. 154(b) by 14 days.

(21) Appl. No.: 16/312,798

(22) PCT Filed: Jun. 28, 2017

(86) PCT No.: PCT/GB2017/051887
§ 371 (c)(1),
(2) Date: Dec. 21, 2018

(87) PCT Pub. No.: WO2018/002612
PCT Pub. Date: Jan. 4, 2018

(65) Prior Publication Data
US 2019/0339231 A1    Nov. 7, 2019

(30) Foreign Application Priority Data

Jun. 30, 2016    (GB) ...................................... 1611446

(51) Int. Cl.
*G01N 21/65* (2006.01)
*G01N 29/024* (2006.01)
(Continued)

(52) U.S. Cl.
CPC ....... *G01N 29/024* (2013.01); *G01N 21/3504* (2013.01); *G01N 21/359* (2013.01);
(Continued)

(58) Field of Classification Search
CPC ............. G01N 29/024; G01N 21/3504; G01N 21/359; G01N 29/343; G01N 29/4454;
(Continued)

(56) References Cited

U.S. PATENT DOCUMENTS 4,515,021 A * 5/1985 Wallace .................. G01F 1/667
73/597
5,392,635 A    2/1995 Cadet et al.
(Continued)

FOREIGN PATENT DOCUMENTS

EP    2 366 981 A1    9/2011
WO    WO 85/00653 A1    2/1985

OTHER PUBLICATIONS

Fletcher, A. J., et al., "Multicomponent Vapor Sorption on Active Carbon by Combined Microgravimetry and Dynamic Sampling Mass Spectrometry," Journal of Physical Chemistry Part B: Condensed Matter, Materials, Surfaces, Interfaces & Biophysical, vol. 106, No. 30, Aug. 2002, XP055422085, pp. 7474-7482.
(Continued)

*Primary Examiner* — Abdullahi Nur
(74) *Attorney, Agent, or Firm* — Pillsbury Winthrop Shaw Pittman, LLP

(57) ABSTRACT

A method of measuring the transit time of an ultrasonic wave in a medium, by passing an ultrasonic wave pulse through a timing path in the medium, receiving the ultrasonic wave pulse at the exit of the timing path and comparing a first signal representative of the ultrasonic wave pulse on entry to the timing path with a second signal representative of the ultrasonic wave pulse received at the exit of the timing path.
(Continued)

At least one cycle and associated zero-crossing point of the first signal is correlated with a corresponding cycle and zero-crossing point of the second signal, and the time interval is measured between the zero crossing points, in order to determine the transit time of the ultrasonic wave through the medium. The method is useful in a sensor for measuring gas composition, as well as bulk gas flow velocity. The sensor and method may be used in a dual channel apparatus for investigating vapour sorption by a substrate.

14 Claims, 12 Drawing Sheets

(51) Int. Cl.
  *G01N 21/3504* (2014.01)
  *G01N 21/359* (2014.01)
  *G01N 29/32* (2006.01)
  *G01N 29/34* (2006.01)
  *G01N 29/44* (2006.01)

(52) U.S. Cl.
  CPC ............ *G01N 21/65* (2013.01); *G01N 29/326* (2013.01); *G01N 29/343* (2013.01); *G01N 29/4454* (2013.01); *G01N 2291/011* (2013.01); *G01N 2291/0215* (2013.01); *G01N 2291/0256* (2013.01); *G01N 2291/02836* (2013.01); *G01N 2291/048* (2013.01); *G01N 2291/101* (2013.01); *G01N 2291/102* (2013.01)

(58) Field of Classification Search
  CPC ..... G01N 2291/011; G01N 2291/0215; G01N 2291/0256; G01N 2291/048; G01N 2291/101; G01N 2291/102; G01H 5/00
  See application file for complete search history.

(56) References Cited

U.S. PATENT DOCUMENTS 5,627,323 A   5/1997  Stern
6,009,380 A  12/1999  Vecchio et al.

OTHER PUBLICATIONS

Ottiger, S., et al., "Competitive adsorption equilibria of $CO_2$ and $CH_4$ on a dry coal," Adsorption, vol. 14, No. 4-5, Mar. 2008, XP019598521, pp. 539-556.

Lane, R. A., et al., "The novel combination of dynamic vapour sorption gravimetric analysis and near infra-red spectroscopy as a hyphenated technique," International Journal of Pharmaceutics, vol. 207, No. 1-2, XP027380129, pp. 49-56.

International Search Report as issued in International Patent Application No. PCT/GB2017/051887, dated Nov. 17, 2017.

\* cited by examiner

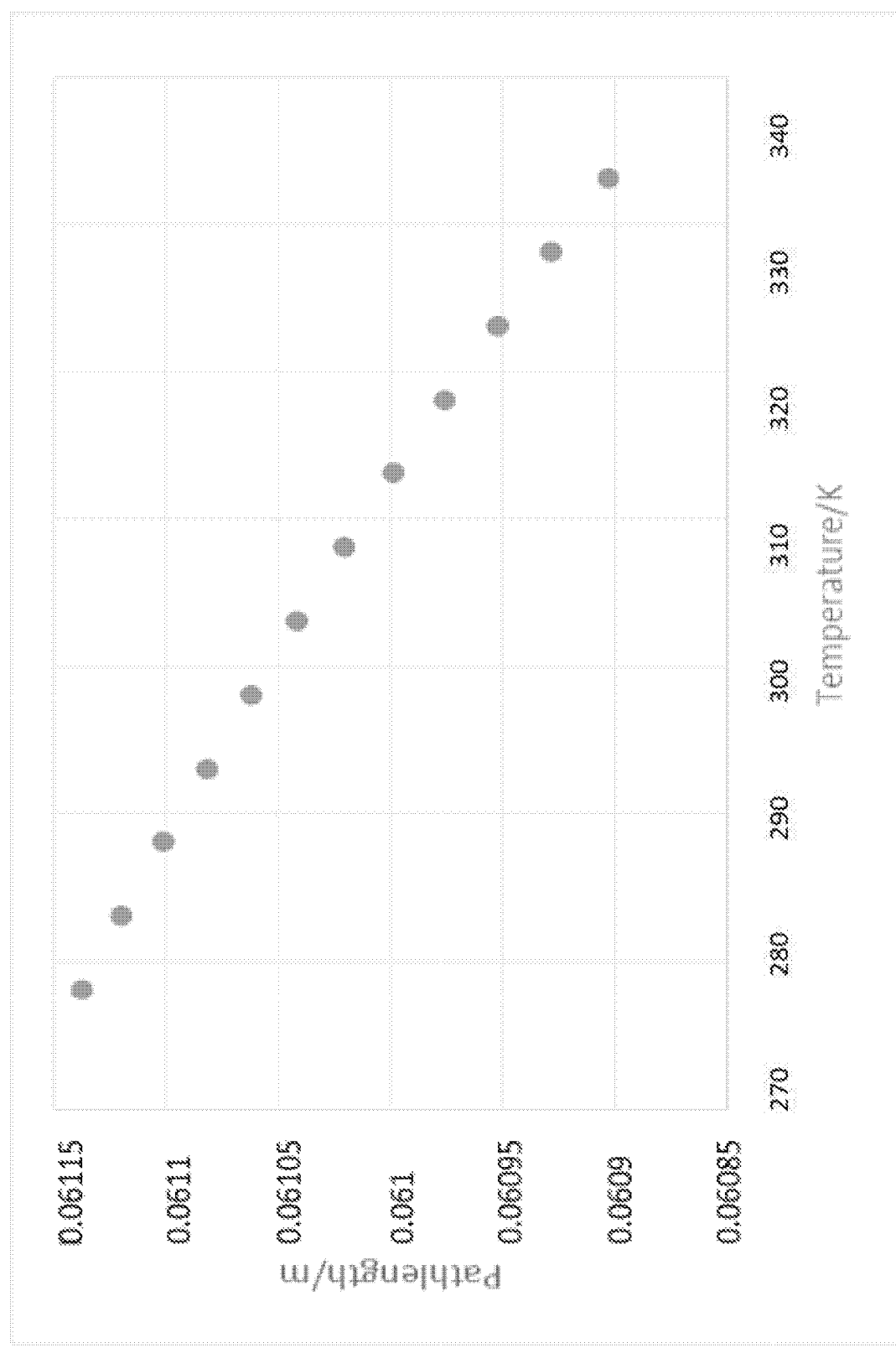
Figure 9 Pathlength versus temperature for argon (a) IR spectrum for Water Vapour interacting with Substrate as a function of %RH (d) IR spectrum for Ethanol Vapour interacting with substrate as a function of %P/P₀ for ethanol

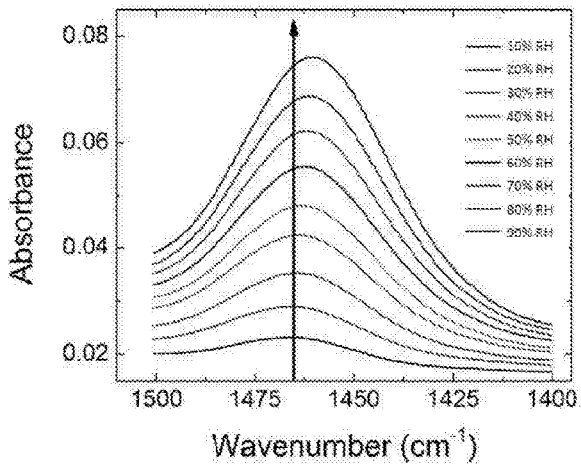
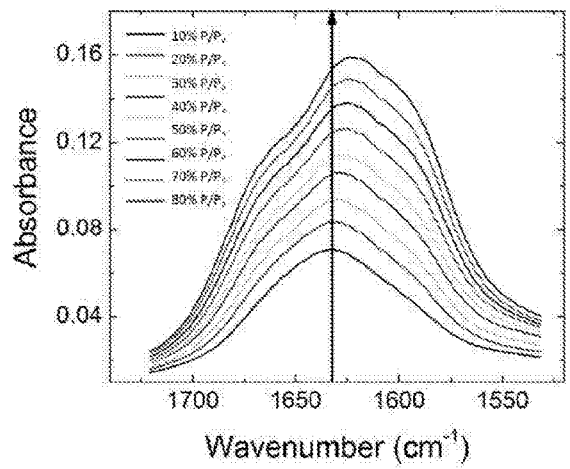

(b) Water sorption isotherm associated with (a)

(e) Ethanol sorption isotherm associated with (d)

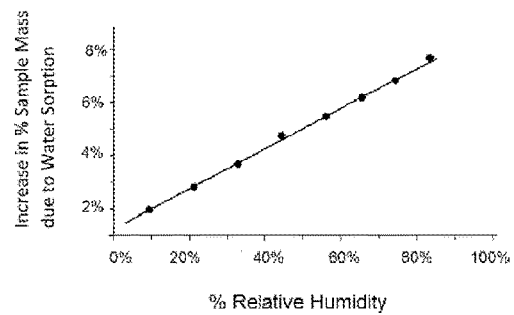
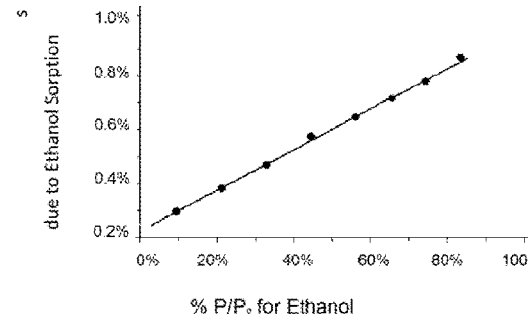

(c) Calibration curve for water sorption using (a) and (b)

(f) Calibration curve for ethanol sorption using (d) and (e)

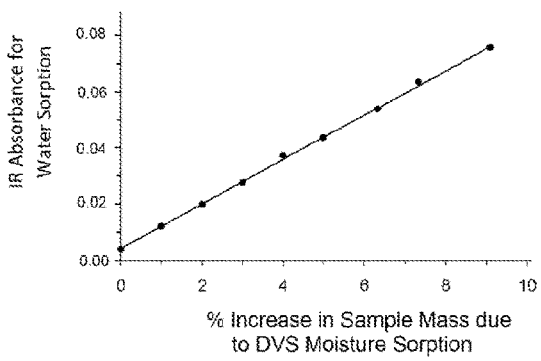
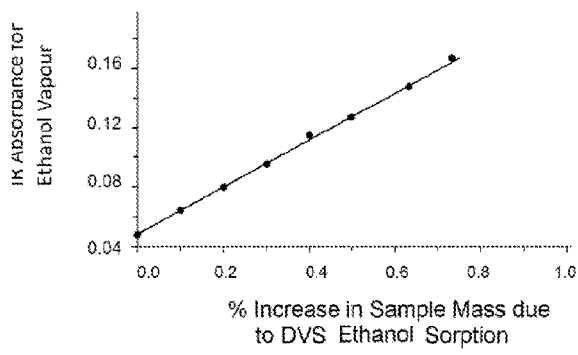

Figure 10 Calibration procedures for single component sorption of water and ethanol vapour (a) IR spectrum for water vapour interacting with substrate in presense of ethanol vapour (b) IR spectrum for ethanol vapour interacting with substrate in presence of water vapour

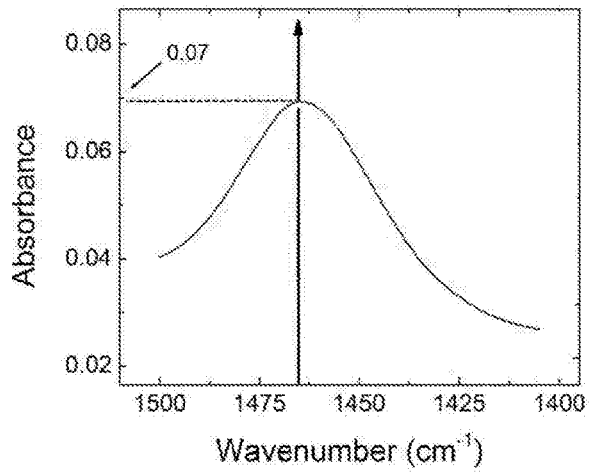
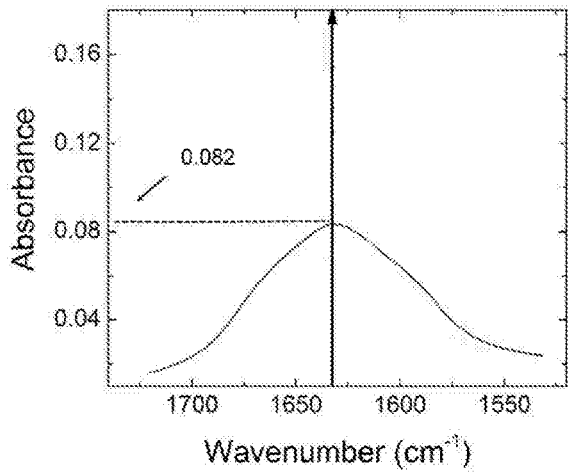

(c) Interpolated calibration curve for water sorption (d) Interpolated calibration curve for ethanol sorption

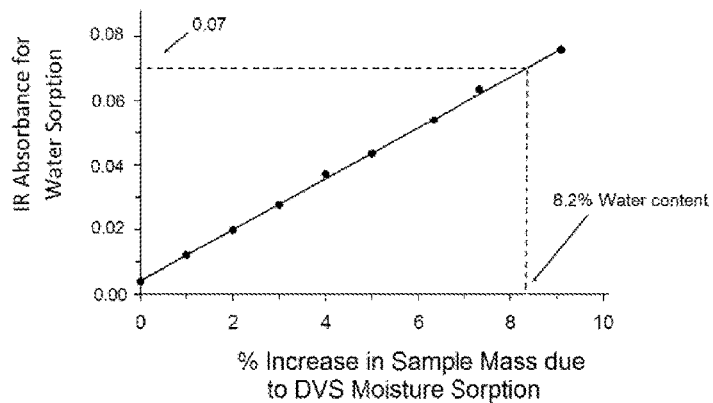

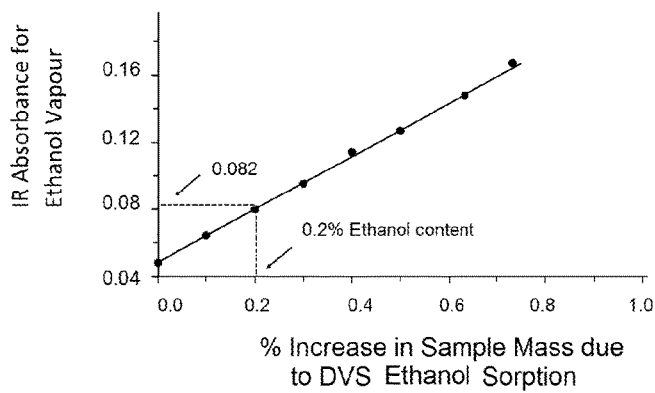

Figure 11 Water and ethanol content determination for multicomponent sorption process

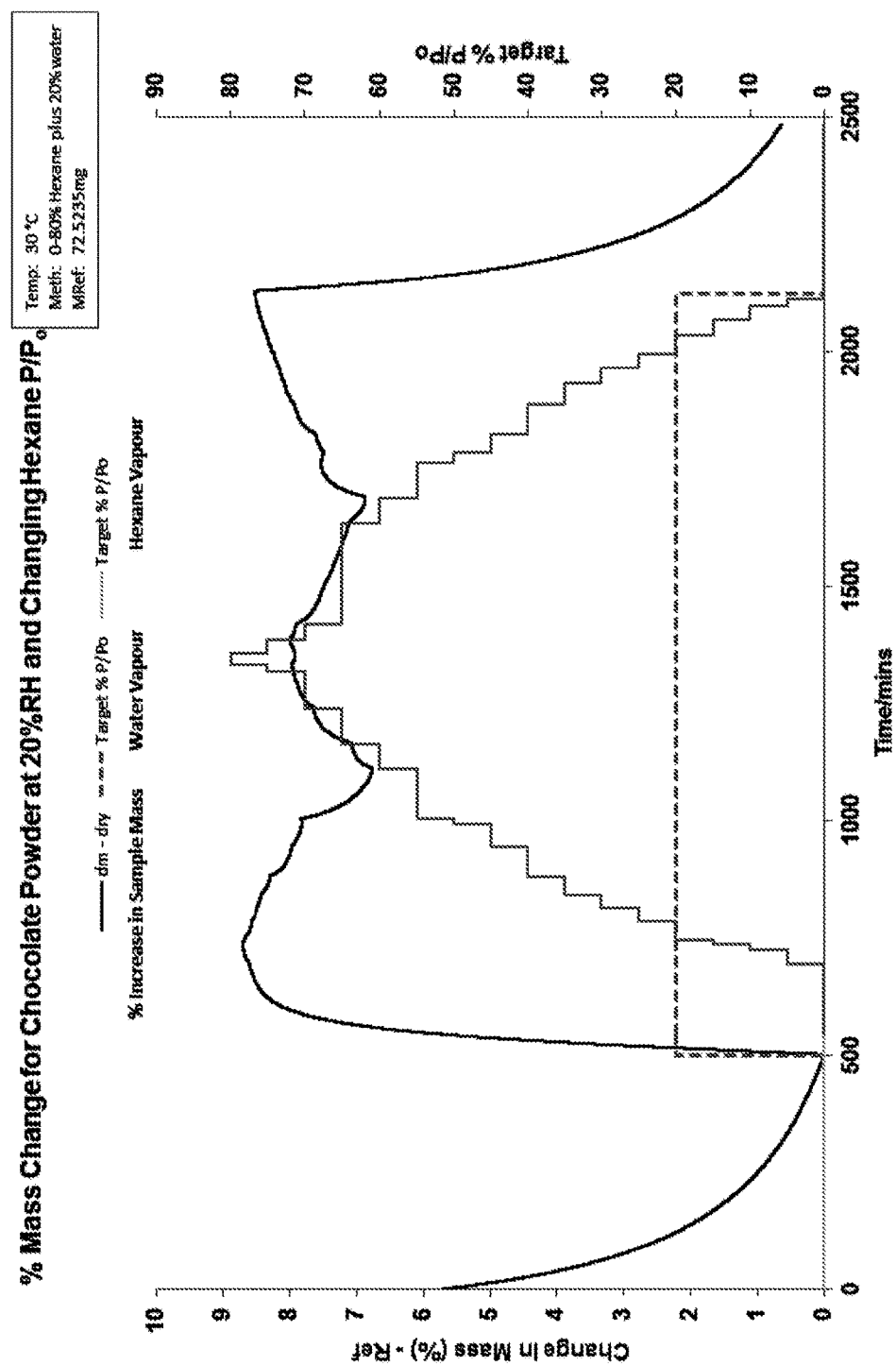
Figure 12 Sorption profile of hexane by a sample of chocolate powder, at a relative humidity of 20%

SENSOR AND USE THEREOF FOR MEASURING SPEED OF SOUND IN GASEOUS MEDIUM AND METHOD AND APPARATUS FOR MEASUREMENT OF VAPOUR SORPTION

This invention relates, in one aspect, to a method and apparatus for measuring sorption of gases and vapours onto substrates.

The invention also relates to an ultrasonic sensor, which may be suitable for use in such an apparatus.

The measurement of sorption of vapours and gases by substrates, particularly solid substrates, has attracted increasing attention in recent years. The term "sorption" as used herein includes within its scope both adsorption (sorption which is focused on the surface of the substrate) and absorption (in which the sorbed substance is dispersed more widely within the substrate). Most attention has been focused on the sorption of moisture by solid state materials, particularly powders, fibres, films, and monolithic solid samples. The most utilised measurement methods depend on one or more of the following principles:—
1) Karl-Fisher Titration;
2) Weight loss on drying;
3) Spectroscopic methods (such as nuclear magnetic resonance (NMR) infrared (IR), and near infrared (NIR);
4) Desiccators containing saturated salt solutions (sometimes called the jar method).

These methods suffer from various disadvantages. They may, for example, be destructive, involving the sample being exposed to extreme environment conditions, which may change the physical and chemical properties of the sample. Many of them require difficult calibration, are very slow, or require large sample masses (more than 1 gram).

More importantly, most prior art methods generally provide a single point measurement (i.e., a measurement of a sorption value under a particular set of temperature, pressure, and composition conditions). They are therefore unable to provide information about the relationship between substrate moisture content and the concentration of water vapour in the air surrounding the sample, (the relative humidity). Such dependency is known as the water sorption isotherm, and is known to be critical in both describing the fundamental behaviour of the material, and in practical terms, in understanding the properties such as shelf life, caking behaviour, powder flow, as well as chemical and physical stability.

Recent years have seen the development of scientific instruments for determining water (moisture) content of solids, as a function of relative humidity, generally described as "sorption instruments". These new instrumentation developments have evolved partially from thermogravimetric (TGA) analysers, and partially from vacuum-type gas sorption instruments.

Both methods have in the past suffered from serious limitations when used to determine water sorption isotherms. TGA methods have relatively poor temperature control at near ambient temperatures, and consequently, accurate humidity control is very difficult to achieve. The use of vacuum methods is generally more demanding experimentally than ambient pressure measurement techniques. As a result, development of TGA and vacuum sorption apparatus has been very limited for water sorption isotherm measurements.

Recent years have seen the development of gravimetric instruments that measure the change in sample mass as a function of relative humidity, at atmospheric pressure, using moisture laden flowing inert gases. An example of equipment of this kind known as dynamic vapor sorption (DVS) is described in Lane et al., "*The novel combination of dynamic vapour sorption gravimetric analysis and near infra-red spectroscopy as a hyphenated technique*", International Journal of Pharmaceutics 207 (2000) 49-56 (the contents of which are incorporated herein by reference).

Various other DVS devices are described in U.S. Pat. No. 7,100,428, GB-A-2408800, U.S. Pat. Nos. 5,440,120, and 4,914,297.

There remains a demand for dynamic vapour sorption devices which are capable of more complex and detailed scientific investigations. In particular, it would be desirable to measure with a very high level of accuracy, the sorption characteristics of a substrate, with respect to each individual component of multi-component gaseous mixtures. This is difficult to achieve with a satisfactory level of accuracy using gravimetric measurements alone, since the presence of each components affects the sorption characteristics of each other component. In particular, a simple measurement of the total mass increase of the substrate during the sorption process does not enable the amounts of individual sorbing components of a multi-component mixture to be distinguished.

The term "multi-component" as used herein is generally understood to mean a gas mixture which contains a carrier gas, and at least two additional components.

In a first aspect of the invention, there is provided a device for investigating sorption of components of a multi-component gas mixture by a substrate, comprising:—
a sample housing location, for receiving the substrate under investigation;
a mixing device for generating a mixture of a carrier gas with each of a plurality selected gaseous and/or vapour components, such that the resulting mixture has a desired composition;
a gas handling system, for selectively causing selected said mixtures to flow over the substrate in the sample housing location, wherein the mixing device is adapted to selectively create;
  (I) an individual mixture of each said component of the desired multi-component gas mixture with the carrier gas, and
  (II) a combined mixture including all of the said components of the desired multi-component gas mixture;
a gravimetric detector, for determining the weight change of the substrate in the sample location as a result of sorption by the substrate of components of the said gas mixtures;
a spectroscopic analyser for measuring a change in a spectroscopic property of the substrate in the sample location as a result of sorption by the substrate of components of the said gas mixtures;
means generating an individual correlation between the said weight change and the said change in a spectroscopic property for each said individual mixture;
and means for measuring the said spectroscopic property of the said combined mixture, and for comparing a result obtained in the said measurement with the said individual correlations, and thereby determining sorption properties of the substrate of said components of the combined mixture.

The DVS apparatus according to the first aspect of the invention is provided with a spectroscopic analyser, for measuring the change in a spectroscopic property of a substrate (such as infrared (IR) near infrared (NIR) or Raman signal intensity) in a sample location, as the result of a sorption by the substrate of components of the gas mixture. For example, IR, or NIR or Raman intensity may be measured, at one or a plurality of wavelengths, and correlated with substrate weight change. This step may be carried out separately for each component of the proposed mixture. Thus an initial sorption vapor/gas sorption process is carried out for as many single component mixtures, as there are components of the proposed gas mixture. For each mixture, a correlation curve is obtained relating the spectroscopic parameter (e.g., IR absorption) to sorption (measured gravimetrically).

Once the calibration curve has been obtained, it may be used to enable the same spectroscopic parameter to act as a proxy for measuring sorption of each component of the gas mixture, during the sorption of a multi-component mixture.

A particularly useful aspect of the method is that enables data to be obtained not only as the components are sorbed onto the substrate, but also as they are de-sorbed from the substrate. Useful information can also be obtained about the kinetics of both processes, and about the competition between the sorption and desorption processes for the different gaseous components present. Detailed information of this kind is particularly difficult or impossible to obtain by normal gravimetric measurements.

The spectroscopic analyser may be a conventional IR/NIR reflectance analyser or Raman detector. The analyser may preferably be a fibre optic spectroscopic device. A light source of an appropriate wavelength is provided to irradiate the sample as the sorption process proceeds, and a detector detects the absorbed, reflected or scattered photons, in a generally conventional manner (for example, as described in the Lane reference discussed above). As is well understood by one skilled in the art, the type of analyser which is applicable to a particular application will depend on the molecular symmetry properties of the sorbed material as well as the spectroscopic behaviour of the sample/substrate under study.

The method may be carried out by directing a spectrometric analyser at the sample/substrate surface, and determining one or more wavelength regions that is strongly indicative of the presence of the sorbing vapour on the substrate. Two or more wavelength regions may be selected for each sorbing vapour, and the results averaged, for improved accuracy. Dynamic range may be improved by selecting both a very strongly absorbing and a more weakly absorbing wavelength region, and correlating response between the two wavelength regions. Gravimetric measurements are carried out at the same time as the spectroscopic measurements in order to obtain a calibration curve of, for example IR absorption (or Raman or NIR response) against mass change, for a binary mixture of one component of the desired mixture, in a carrier gas.

The exercise is then repeated at a different spectroscopic wavelength, for a binary mixture of a second component of the desired mixture in the carrier gas, so as to obtain a calibration curve for the second component. This procedure is repeated for each component to be included in the gas mixture.

After the calibration curves have been obtained, the desired multi-component gas mixture is passed over the substrate, and the individual calibration curves are used (as well as a gravimetric analysis), to ascertain sorption isotherms for the individual components when present as components of the mixture.

One particular advantage of the above method is in the measurement of de-sorption isotherms, which are generally difficult to obtain. The method also opens up the possibility to obtain detailed data on the kinetics of sorption (and de-sorption) of multi-component mixtures. Such data is generally very difficult to obtain by other methods. The use of a spectroscopic method also permits measurements of desorption of multi-component gas/vapor mixtures to be made without the necessity of heating the sample to a high temperature to release the sorbed species as proposed by Benham et al (*Multicomponent Vapor Sorption on Active Carbon by Combined Microgravimetry and Dynamic Sampling Mass Spectrometry*, Benham, M J Thomas, K M Fletcher, A J Benham, M J Thomas, K M, The Journal of Physical Chemistry, 2002, 106, p. 7474-7482).

In a preferred embodiment, the apparatus includes a gas/vapour composition sensor which operates by measurement of the transit time of an ultrasonic wave over a fixed path in the gas/vapour medium, (in effect, measuring the speed of sound) in the gas/vapour medium. The term "ultrasonic" as used herein is intended to refer to any frequency within the ultrasonic frequency range, for example, frequencies in the range of 25 kHz to 500 kHz. Generally, frequencies in the range of 50 kHz to 200 kHz are preferred.

"Speed-of-sound" sensors are known for the measurement of binary gas compositions. Generally such detectors operate by transmitting an ultrasound pulse along a timing path through the composition, using the maximum pulse amplitude to trigger a timer start event on entry of the pulse to the timing path, and a timer stop event on exit of the pulse from the timing path. We have determined however that significant distortion of the ultrasound pulse shape can occur during its transmission through the gaseous medium, particularly if it undergoes reflection. We have discovered that a particular novel mode of operation can provide greatly improved precision and reliability to the measurement obtained.

According to a second aspect of the invention, there is provided a method of measuring the transit time of an ultrasonic wave in a medium, comprising:— passing an ultrasonic wave pulse through a timing path in the medium, the ultrasonic wave pulse including a plurality of cycles;

receiving the ultrasonic wave pulse at the exit of the timing path;

comparing a first signal representative of the ultrasonic wave pulse on entry to the timing path with a second signal representative of the ultrasonic wave pulse received at the exit of the timing path, the said first and second signals each including a plurality of cycles;

thereby correlating at least one cycle of the first signal with a corresponding cycle of the second signal;

determining a zero-crossing point associated with the said cycle of the first signal;

determining a zero-crossing point associated with the said corresponding cycle of the second signal;

measuring the time interval between the said zero crossing points;

and thereby determining the transit time of the ultrasonic wave through the medium.

In a third aspect, the invention provides a sensor for measuring the transit time of an ultrasonic wave in a medium, comprising:— at least one ultrasonic transducer for creating an ultrasonic wave pulse through a timing path in the medium, and receiving the ultrasonic wave pulse after passage through the timing path, wherein the ultrasonic wave pulse includes a plurality of cycles;

means for comparing a first signal representative of the ultrasonic wave pulse on entry to the timing path with a second signal representative of the ultrasonic wave pulse received at the exit of the timing path, the said first and second signals each including a plurality of cycles, and for thereby correlating at least one cycle of the first signal with a corresponding cycle of the second signal;

means for determining a zero-crossing point associated with the said cycle of the first signal;

and a zero-crossing point associated with the said corresponding cycle of the second signal; measuring the time interval between the said zero crossing points, thereby to determine the transit time of the ultrasonic wave through the medium.

We have found in particular that distortion of the ultrasonic pulse during transit or reflection can generate a sufficient amount of noise that the cycle within the pulse train which corresponds to the maximum of the pulse entering the timing path may not correspond to the maximum in the pulse as it exits the timing path. Reliance simply on measuring the elapsed time between pulse maxima therefore gives unreliable results. We have discovered that precision and reliability is significantly improved if the cycle of the transmitted ultrasonic wave pulse which is selected as an index point is selected to be the one with an amplitude which most closely approximates to a defined fraction (referred to herein as the "fractional-height cycle") of the maximum amplitude of the wave pulse.

In a particularly preferred embodiment, the zero-crossing point which is selected for measurement is a zero-crossing point associated with (preferably one which immediately follows or immediately precedes) the amplitude which most closely approximates to half the maximum amplitude of the wave pulse (referred to herein as the "half-height cycle").

However, provided that cycle which is chosen is the same for both the transmitted pulse and the received pulse, (i.e., provided that the amplitude of the chosen pulse corresponds to the same fraction of the pulse maximum, for both the transmitted pulse and the receiving pulse), the precise fraction which is chosen is not of fundamental importance. For example, the cycle which is chosen for the elapsed time measurement may be the one with an amplitude closest to three quarters, two thirds, or one third of the maximum pulse amplitude. We have generally found however that use of the "half-height cycle" as the index point for the measurement gives excellent results, as well as simplifying computation.

Having established a correlation between a specific cycle (referred to for ease of reference of the "primary cycle") of the received and transmitted pulses, the time difference between other cycles can be determined, by indexing corresponding pulses of the received and transmitted pulses from the primary cycle. The values may then be then averaged, in order to improve measurement precision.

Accordingly, the method according to the second aspect of the invention preferably includes the step of correlating at least one further cycle of the first signal with a corresponding cycle of the second signal, by measuring the time difference between the first said cycle and the said at least one other cycle in each of the first and second signal, thereby measuring the time interval between a zero crossing point associated with the said at least one further cycle of the first signal and a corresponding zero crossing points associated with the said at least one further cycle of the second signal, to obtain at least one further value for the transit time of the ultrasonic wave through the medium, and averaging the values obtained for the transit time of the ultrasonic wave through the medium in order to improve measurement precision.

In further aspects of the invention, ultrasonic gas sensors are provided, operating by measurement of the speed of sound, which have a number of particular features and advantages. In one such embodiment, an ultrasonic gas composition sensor is provided, which includes two ultrasound transducers. Such an arrangement facilitates measurement not only of the gas/vapour composition, but also of the mass transport velocity of the gas/vapour. The mass transport velocity within a known cross-section area of the sensor tube can be then be used to directly determine volumetric gas flow rates.

Accordingly, in a fourth aspect of the invention, there is provided a sensor for measuring the composition of a gas, comprising:— a body structure defining a flowpath for a gas to be measured;

means for measuring the temperature of gas flowing in the flowpath;

a first ultrasonic transducer and a second ultrasonic transducer located within said body structure, for passing an ultrasonic wave through the gas along a timing path;

and a processing unit for measuring the transit time of the ultrasonic pulse along the timing path;

wherein the sensor is operable in a first operation mode, in which the first ultrasonic transducer operates as an ultrasonic transmitter and the second ultrasonic transducer operates as an ultrasonic receiver, and in a second operation mode, in which the first ultrasonic transducer operates as an ultrasonic receiver and the second ultrasonic transducer operates as an ultrasonic transmitter;

and wherein the processing unit is operable to measure the transit time of the wave along the timing path and thereby determining the composition of the gas, and to compare the speed of the ultrasonic wave in the first operation mode to the speed of the ultrasonic wave in the second operation mode, and thereby determine the velocity of the gas in the sensor.

The invention also provides apparatus for investigating vapour absorption by a substrate, having a sample housing location, for receiving the substrate under investigation;

a gas-generating device for generating a gas mixture having at least two components;

a gas handling system, for causing the gas mixture to flow over the substrate in the sample housing location, and a detector, for measuring sorption of components of the gas mixture by the substrate;

wherein the apparatus includes a sensor for measuring the composition of a gas, comprising a body structure defining a flowpath for a gas to be measured;

at least two ultrasonic transducers positioned adjacent the flowpath for creating an ultrasonic wave along a timing path between the transducers, in a gas flowing in the flowpath;

and a processing unit for measuring the speed of passage of the wave along the timing path through the gas, and thereby determining the composition and the mass transport velocity of the gas.

In order to measure the speed of sound to a high precision, sensors used in the apparatus of the present invention rely on the highly accurate measurement of transit time of a sound pulse through the gaseous medium (i.e., in effect, the "speed of sound" in the medium), in order to determine the composition of the medium, and, at least in preferred embodiments, the bulk flow velocity of the medium. The speed of sound is highly dependent on temperature, and it is desirable therefore that any temperature variation within the flow path be maintained at as low a level as possible, and preferably controlled within an accuracy of ±1 mK. In order to improve temperature control, one embodiment of the invention provides a sensor in which the gas mixture to be measured is temperature-equilibrated, prior to measurement, by means of a specific sensor design. Accordingly, in a fifth aspect of the invention, a sensor for measuring the composition of a gas comprises a body structure defining a flowpath for a gas to be measured;

at least one ultrasonic transducer for creating an ultrasonic wave along a timing path located within the gas flowpath means for measuring the transit time of the ultrasonic wave along the timing path in the flowpath;

wherein the body structure includes a circular wall portion surrounding the said timing path, wherein the gas flowpath includes a temperature equilibration conduit extending for a plurality of revolutions around the said wall in thermal contact therewith, and wherein the arrangement is such that gas to be measured is caused to first flow through the temperature equilibration conduit before being caused to flow along the timing path, whereby the temperature of the gas flowing in the temperature equilibration conduit is equilibrated to that of the said wall, before the speed of the ultrasonic wave is measured.

In a preferred embodiment, the temperature equilibration conduit is embedded in the circular wall portion.

An additional requirement for accurate determination of the transit time of a wave pulse in such a sensor is that the path over which the wave travels (referred to herein as the "timing path") does not vary in length due to external factors such as thermal expansion and contraction of components. In one embodiment, the sensor in accordance with the invention is constructed so as to compensate for changes which might otherwise be caused by thermal expansion of components. In sixth aspect of the invention, there is provided a sensor for measuring the composition of a gas, comprising a body structure defining a flowpath for a gas to be measured;

means for measuring the temperature of gas flowing in the flowpath;

at least one ultrasonic transducer for creating an ultrasonic wave in a gas flowing in the flowpath and receiving the ultrasonic wave after passage through the gas;

wherein said at least one ultrasonic transducer is located within said body structure so as to define a timing path through the gas for the ultrasonic wave;

and a processing unit for determining the composition of the gas, based on the speed of passage of the wave along the timing path through the gas;

wherein the said body structure is constructed of at least two different materials, having different thermal expansion coefficients, and wherein the construction of the sensor is such that the differential expansion of the said materials compensates for thermal expansion and contraction of components of the sensor, which would otherwise cause changes in the length of the timing path.

For example, the sensor may include two transducers, each transducer mounted on a support, and with the supports connected together by a connecting piece, so as to form a sub-structure supporting the transducers. Thermal expansion of the transducers themselves tends to shorten the distance between the transducer faces, and thereby shorten the timing path length. Thermal expansion of the connecting piece connecting the transducer supports tends to lengthen the path length however, thereby compensating for the thermal expansion of the transducers. By choosing of a material for the connecting piece with an appropriate thermal expansion coefficient, it is possible to reduce to a very low value any change in the timing path length with temperature.

The sub-structure may be supported inside the body of the sensor by a non-rigid attachment, for example by O-rings, in order to isolate it from expansion of the sensor body.

In a further preferred embodiment, further temperature compensation may be provided by applying an electronic correction to the length of the timing path, to compensate for the effects of thermal expansion or contraction of the sensor components. In particular, the thermal expansion characteristics of the sensor may be determined by measuring the transit time for ultrasonic waves using an inert gas such as argon at a series of temperatures, typically from 5 to 85° C. Based on that data, an accurate calculation is made of the expansion characteristics of the timing path length with temperature. Once the calibration curve has been obtained, it can be used in association with a temperature sensor to obtain a very accurate value for the length of the timing path, under the conditions of measurement. The calibration curve may be stored in a computer memory, either as a lookup table or as coefficients of a polynomial expansion.

Although each of the specific sensor features mentioned above may be utilised separately, they may be used in any combination. For example the sensor of the third aspect of the invention may also incorporate the feature of any or all of the sensor of the fourth, fifth, and sixth aspects. Similarly, the sensor of the fourth aspect of the invention may also incorporate the feature of any or all of the sensor of the third, fifth, and sixth aspects, the sensor of the fifth aspect may incorporate the feature of any or all of the sensor of the third fourth, and sixth aspects, and the sensor of the sixth aspect may also incorporate the feature of any or all of the sensor of the third fourth, and fifth aspects.

The most preferred sensor incorporates all of the third, fourth, fifth and sixth aspects. Likewise, devices in accordance with the first and second aspects preferably include sensors having the features any combination of the third, fourth, fifth and sixth aspects.

Preferred embodiments of various aspects of the invention will now be described with reference to the accompanying drawings, in which:—

FIG. 9 is a path length calibration curve for Argon using an ultrasonic sensor (9) versus temperature;

FIGS. 10 and 11 show various absorbance curves, sorption isotherms, and calibration curves illustrating the first aspect of the invention for the case of simultaneous sorption of water and ethanol vapour;

FIG. 12 is profile showing absorbance of hexane by a sample of chocolate, at a relative humidity of 20%.

Figure 1:
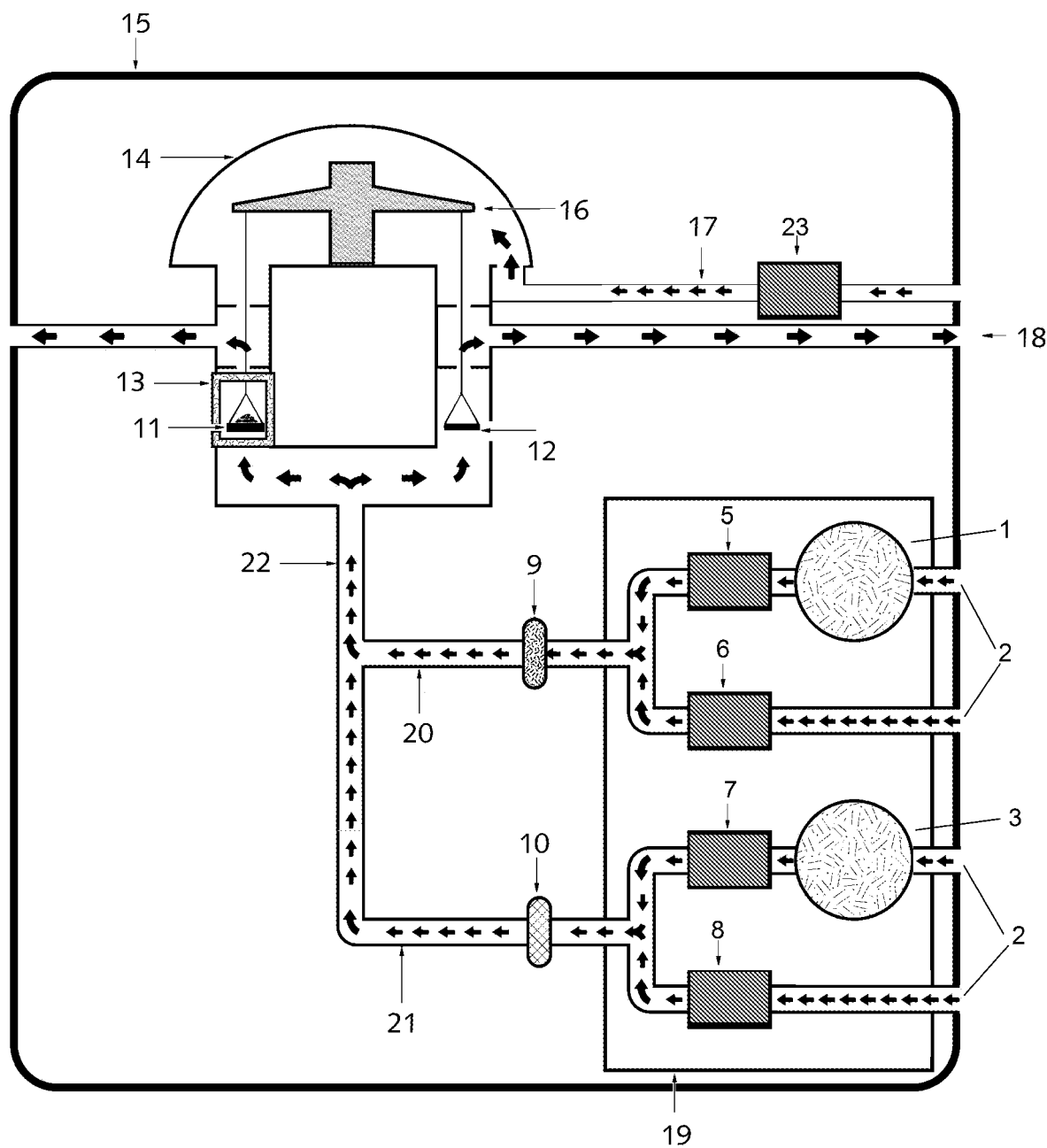
FIG. 1 illustrates a general schematic diagram of a DVS instrument in accordance with the present invention, capable of generating and measuring 3-component solute mixtures.

Referring first to FIG. 1, which illustrates in general schematic terms the layout of a dynamic vapour sorption (DVS) device in accordance with an aspect of the invention, the device includes an instrument enclosure (14), which has within it a microbalance (16) having a sample pan (11) and a reference pan (12). A supply (17) of clean nitrogen or air is provided to sweep through instrument enclosure (14), to prevent contamination by gases flowing in other parts of the instrument, and avoid potential damage to balance (16) by contact with the (potentially corrosive) gas mixture under test generated by the gas handling system (19).

Instrument enclosure (14) and a gas handling system (19), are enclosed within a constant temperature enclosure (15).

Gas handling system (19), is configured to supply a gas mixture with a variable but carefully controlled composition to enclosure (14) via conduits (20, 21, and 22).

The gas handling system has four gas/vapour feeds, controlled by respective mass flow controllers (5, 6, 7, & 8). By means of the mass flow controllers (5, 6, 7, & 8), the flows in the respective feeds may be blended in any desired manner, to provide a gas flow of any desired composition, as will be described in more detail below. A "carrier gas", for example, nitrogen or dry air is supplied to each of four inlet feeds (2). Solvent reservoirs (1) and (3) include a liquid solvent (such as ethanol or hexane), and a bubbler, for passing a stream of the carrier gas though the solvent, to provide a saturated vapour stream of the solvent in the carrier. Alternatively if it is desired to utilise a component which is gaseous (for example methane or ethylene), reservoirs (1) and (3) may be left empty, and the gaseous feed connected to the corresponding inlet (2).

The gas flows from mass flow controllers (5 and 6) are combined and fed to conduit (20), via a gas composition sensor (9), and the flows from mass flow controllers (7 and 8) are similarly fed to conduit (21), through a second gas composition sensor (10). Sensors (9) and (10) are preferably ultrasonic sensors of the type which will be described in more detail hereinafter. Flows from conduits (20 and 21) are in turn combined into conduit (22), and caused to flow over sample pan (11) and reference pan (12). A heater (13) is provided, surrounding the sample pan (11). Heater (13) is able to heat the sample pan and the substrate radiatively or convectively to a temperature of up to 350° C. (i.e., much higher than that of the maximum temperature achievable in the temperature enclosure (15), which typical is able to reach only 85° C.). The heater can be used for drying or pre-treating the sample prior to sorption analysis.

Figure 7:
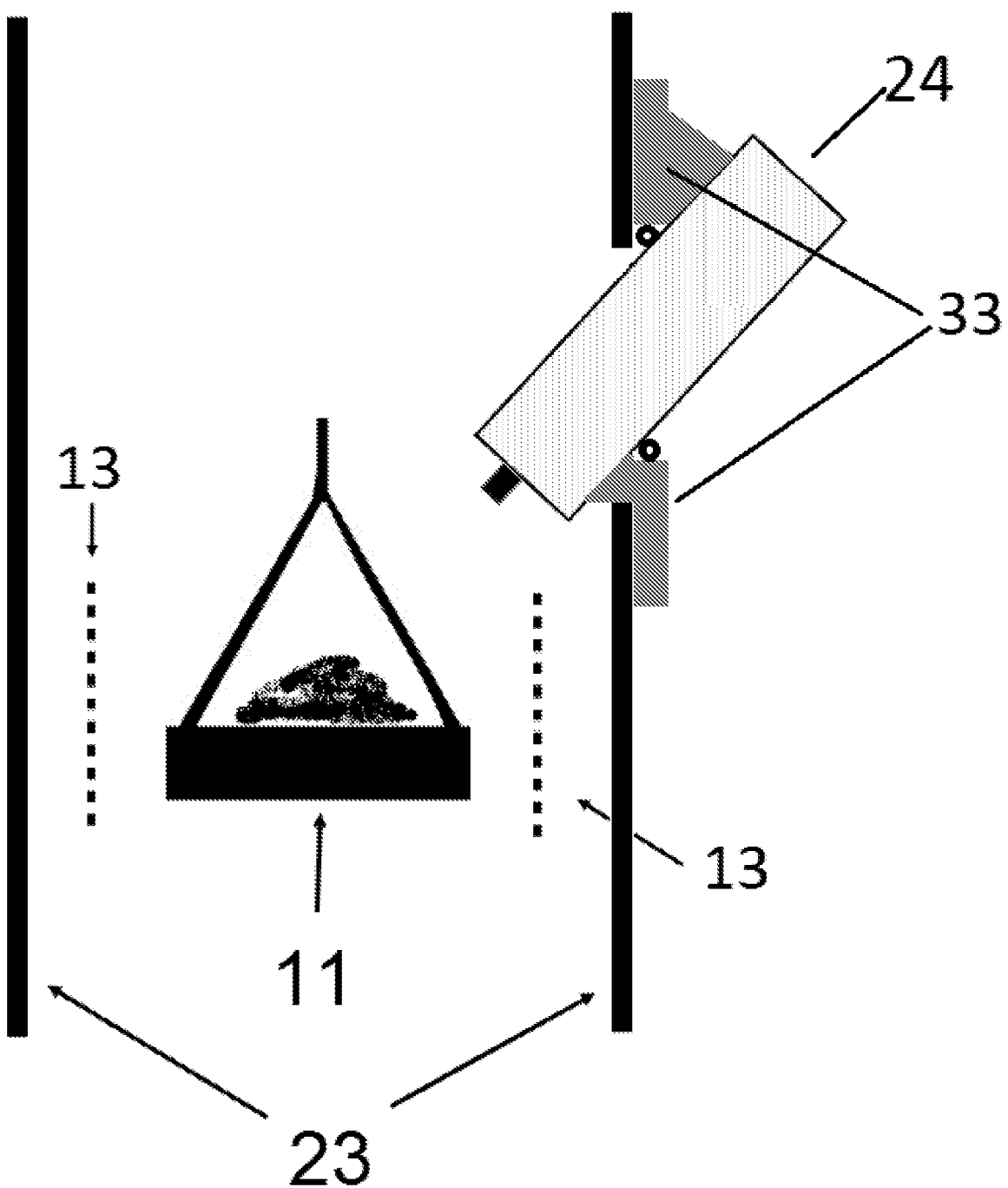
FIG. 7 is an enlarged schematic view of heater (13) of FIG. 1, showing a spectroscopic detector.

FIG. 7 is an enlarged view of the instrument enclosure in the vicinity of the heater (13) of FIG. 1, showing a combined spectroscopic transmitter and detector (24), directed so as to permit infrared absorption and or Raman data to be obtained from a sample/substrate positioned in the sample pan (11) which is surrounded by cylindrical heater (13). Transmitter/detector (24) is a fibre optic device, consisting of an integrated transmitter and a detector element, able to slide inside a sensor holder (33) secured by sealing o-rings (33). The holder and O-rings hermetically seal instrument enclosure (14) so that no gas can escape from or enter the enclosure (14) in the vicinity of where the fibre optic sensor enters the enclosure.

The presence of four independent mass flow controllers (5, 6, 7 and 8) allows a very wide range of compositions to be supplied, and controlled to within very exact tolerances. For example, if a simple composition consisting only of single solvent vapour in a carrier gas is desired, only the upper two feeds are needed, with appropriate control of the mass flow controls (5) and (6). If an additional gas component is required, this can be supplied using the lowermost feed and mass flow controller (8). If an additional vapour is required mass flow controller (7) can be utilised. A control circuit (not shown) provides feedback from composition sensors (9 and 10) to mass flow controllers (5 and 6, and 7 and 8) respectively, in order to maintain the desired composition.

By measuring change of mass in the sample under different gas composition, a multi-dimensional sorption isotherm may be developed.

A particular embodiment of an experimental sorption/desorption method for two species (referred to as vapour F and vapour G) which are co-sorbed in the solid sample may be carried out using the following steps:

(i) Obtain separate vapour adsorption isotherms for binary mixtures of vapour F with an inert carrier gas and for vapour G with an inert carrier gas;

(ii) Whilst measuring the isotherms in step (i), simultaneously obtain Raman or FTIR or NIR spectra of the solid state samples by directing light with an appropriate frequency distribution to onto the sample surface by means of a fibre optic, and measuring the reflected or scattered or absorbed light, Suitable methods are described in the "Lane et al" reference mentioned above. These spectra contain spectral information about both the substrate and the adsorbing species F or G. The choice of whether to use Raman or NIR or FTIR is used will depend upon the quality of the spectral information and the spectroscopic bands which are vibrationally active in the adsorbed species F and G;

(iii) Generate two calibration graphs of the change in spectral intensity as a function of change in mass, for both species F and G, using the gravitational mass data obtained and the spectra information obtained in (i) and (ii);

(iv) Permit sorption and desorption of one or more of components F and G, by varying the composition of the surrounding gas flow, for example by substituting a flow of just inert carrier gas, whilst obtaining spectroscopic data on the presence of F and G within the substrate. From the calibration graphs determined in (iii) a full description of the amount of F and of the amount of G adsorbed in the solid sample can be fully quantified, including both kinetics and equilibrium sorption content.

FIGS. 10 (a-f) and 11 (a-d) illustrates an example of the above procedure for the case of simultaneous sorption of water and ethanol vapour, using a nitrogen carrier. FIG. 10 illustrates the first stage of the experimental process where the calibration curves for water and ethanol single component sorption are measured with DVS and IR. IR absorbance is measured for nitrogen/water vapour mixtures, at water concentrations (relative humidities) of from 10 to 90%, and for ethanol/nitrogen mixture of from 10 to 80% (FIGS. 10(a) and 10(d) respectively. Simultaneously, the mass changes in the samples are measured in the presence of the same gas mixtures (FIGS. 10(b) and 10(e). Those data are combined to generate calibration curves of moisture sorption uptake versus spectroscopic IR absorption (FIG. 10(c)) and ethanol sorption uptake versus spectroscopic IR absorption FIG. 10(f).

Having obtained the single component calibration curves, the sample is exposed to a multi-component mixture of ethanol and water vapour (in a nitrogen carrier with a known composition. The resultant spectroscopic responses for both water and ethanol sorption by the substrate are shown by FIGS. 11(a) and 11(b). Interpolation of the calibration curves FIGS. 10(c) and 10(f) using these two spectroscopic absorptions for water and ethanol (FIGS. 11 (a) and (b)) allows the water and ethanol content in the substrate to be extrapolated as shown in FIGS. 11(c) and 11(d). This gives a water content of 8.2% and an ethanol content of 0.2% for this specific multi-component sorption condition.

By a similar method, the ethanol and water uptake can be ascertained for any desired mixture.

The above-described method is useful in a wide range of practical applications. An every day example is the investigation of the uptake of an organic vapour such as a fragrance or flavour species by a material such as a food product. With hitherto available methods it generally only possible to investigate such uptake using various concentrations of the organic species in dry air. In accordance with the invention, it is possible to investigate quantitatively the effect of atmospheric humidity on the extent to which organic vapour is taken up by the food product. In particular, isotherms may be obtained for absorption of the organic species at selected relative humidity levels, by using one channel of the apparatus to produce an air flow at the selected humidity level, which are then combined with a flow of the organic vapour, from the other channel.

An example of the practical application of this is illustrated in FIG. 12, which shows an absorbance profile of hexane by a sample of chocolate, at a relative humidity of 20% at 30° C. It can be seen that initially the sample loses about 5.5% of mass as it dries at 0% relative humidity, over a period of 500 minutes. The sample is then exposed to water vapour only (i.e., air with a relative humidity of 20%), and the sample mass increases by about 8% from the dry mass.

When this sample is then exposed to hexane vapour (from about 700 minutes on the time axis), the total mass of the sample decreases due to the competition of hexane for sites occupied by water vapour molecules. As the partial pressure of hexane is increased to a maximum at approximately 1250 minutes on the time axis, the loss of mass increases. For this particular system it is found that the process is predominantly reversible, as shown by the mass response to decreasing hexane concentration, in the range 1250 to 2200 minutes on the time axis.

A further example of the types of system which can be studied using apparatus according to the invention is the study of competitive adsorption between $CO_2$ and CO, for example, on a porous substrate such as activated carbon or a zeolite. In this case a true competition for the surface sites will exist between $CO_2$ and CO. The total change in sample mass as determined gravimetrically due to both $CO_2$ and CO sorption, will not provide any information as to the relative amounts of $CO_2$ and CO which are adsorbed. However, spectroscopic information obtained using the apparatus as illustrated in FIG. 7 allows the fraction of $CO_2$ or CO or even both, to be determined, as a function of critical system variables including temperature, partial pressure of $CO_2$, partial pressure of CO and total system pressure.

Figure 2:
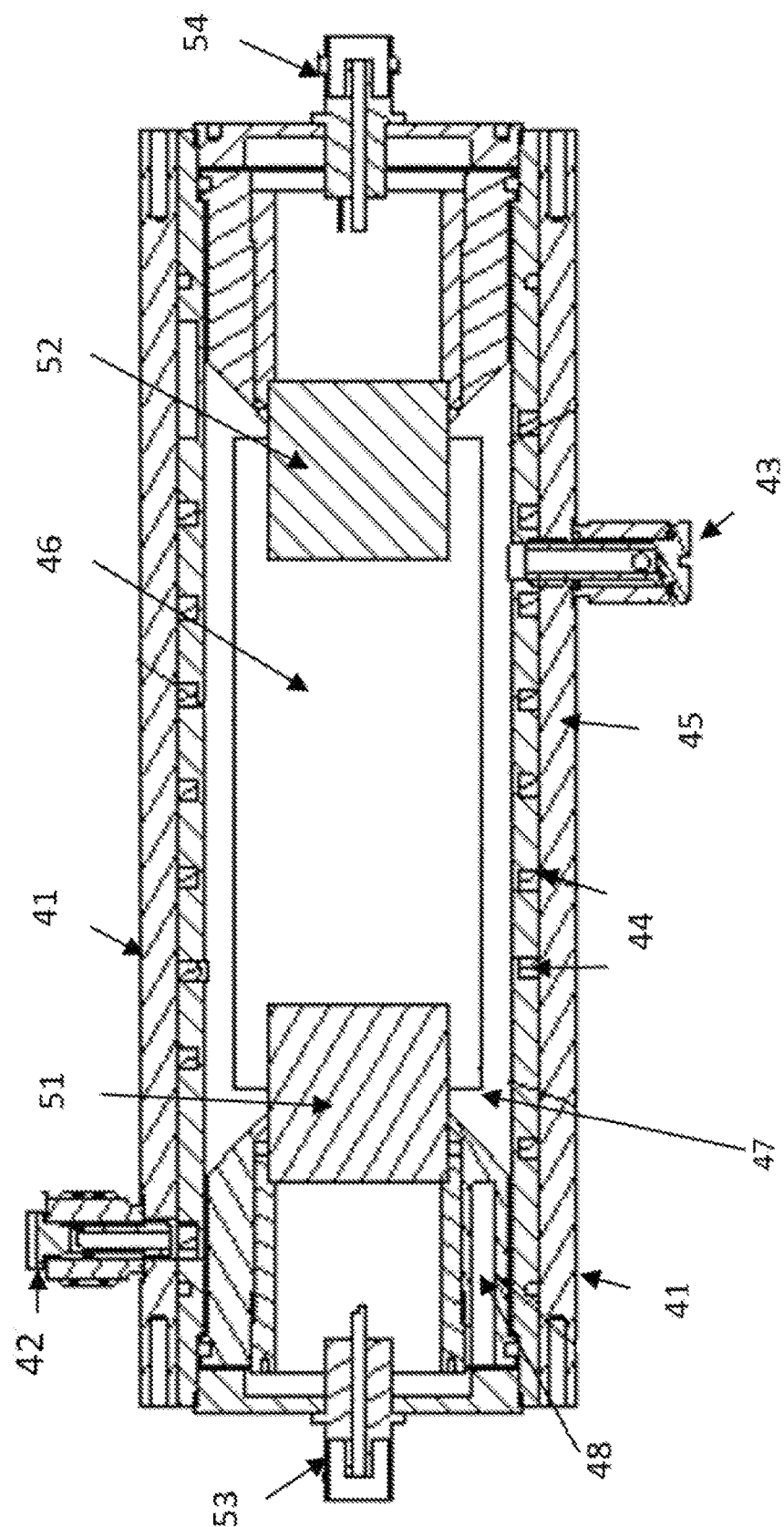
FIG. 2 is a schematic representation of an ultrasonic sensor for measurement of the composition of a gas mixture.
Figure 3:
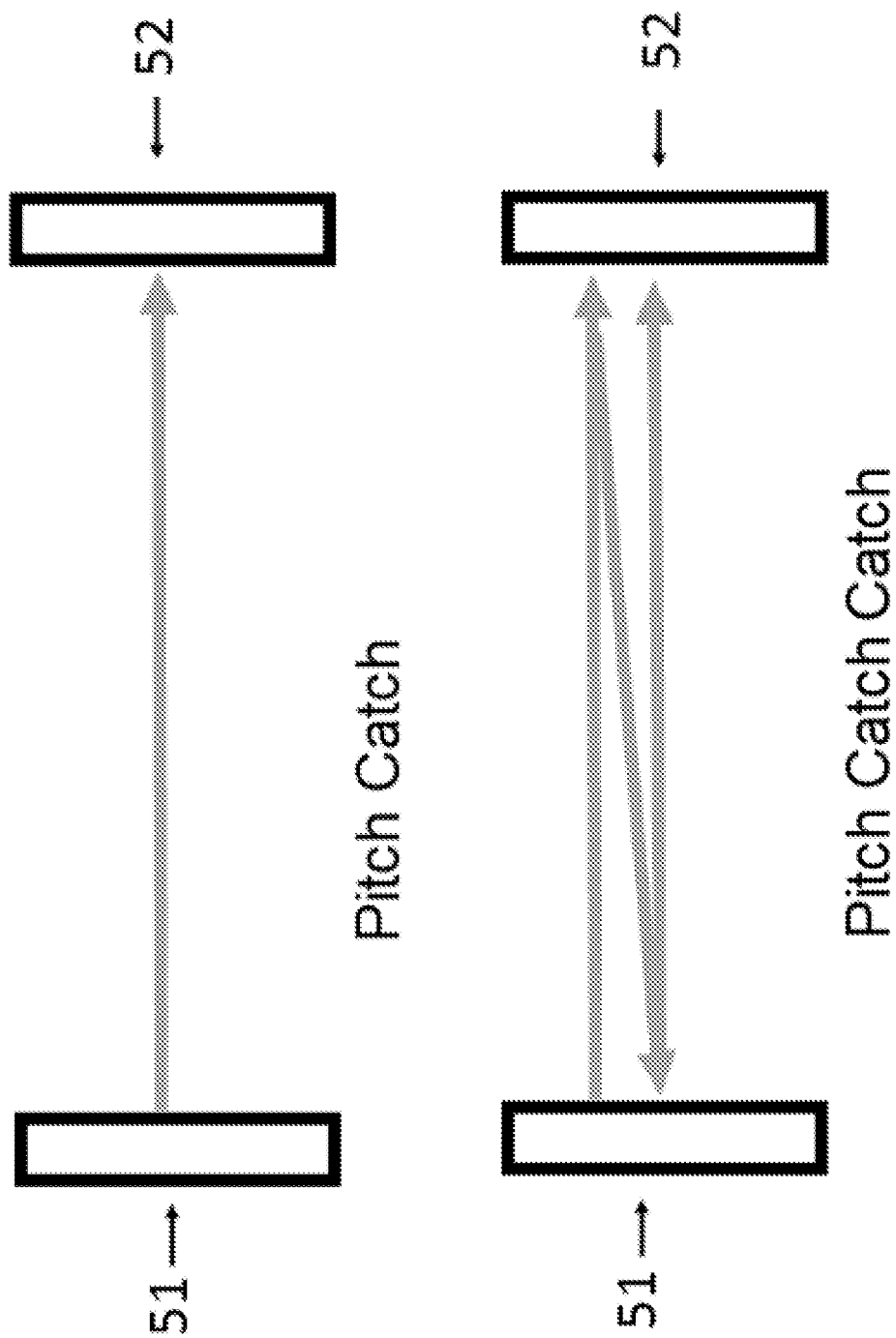
FIG. 3 illustrates a "pitch catch" and "pitch catch catch" mode of operation.

A preferred embodiment of a sensor suitable for use in the present apparatus is illustrated in FIG. 3. The sensor of FIG. 2 includes a cylindrical body structure (41), having a gas inlet (42), and a gas outlet (43), defining a flow path for a gas. Body (41) is formed of a material with high thermal conductivity. The material may be, for example, stainless steel, or copper, but is preferably brass, since this has a higher thermal conductivity than stainless steel and better corrosion resistance than copper. The material forming the body wall (41) preferably has a thermal conductivity of at least 100 $W \cdot m^{-1} \cdot K^{-1}$). A heat equilibration channel (44) is formed in the wall (45) of body (41), in a spiral configuration, thus providing a labyrinthine path for the gas flowing between outlet (42) and outlet (43). The labyrinthine path preferably has a length of at least 50 mm, more preferably at least 50 cm, more preferably at least 1 metre, in order to allow for equilibration of the gas temperature. After temperature equilibration in channels (44), the gas flow enters the main chamber (46).

Ultrasonic transducers (51 and 52) are provided at opposed ends of chamber (46). Transducers (51 and 52) are externally connected to control equipment, by means of BNC connectors (53 and 54) respectively.

Figure 8:
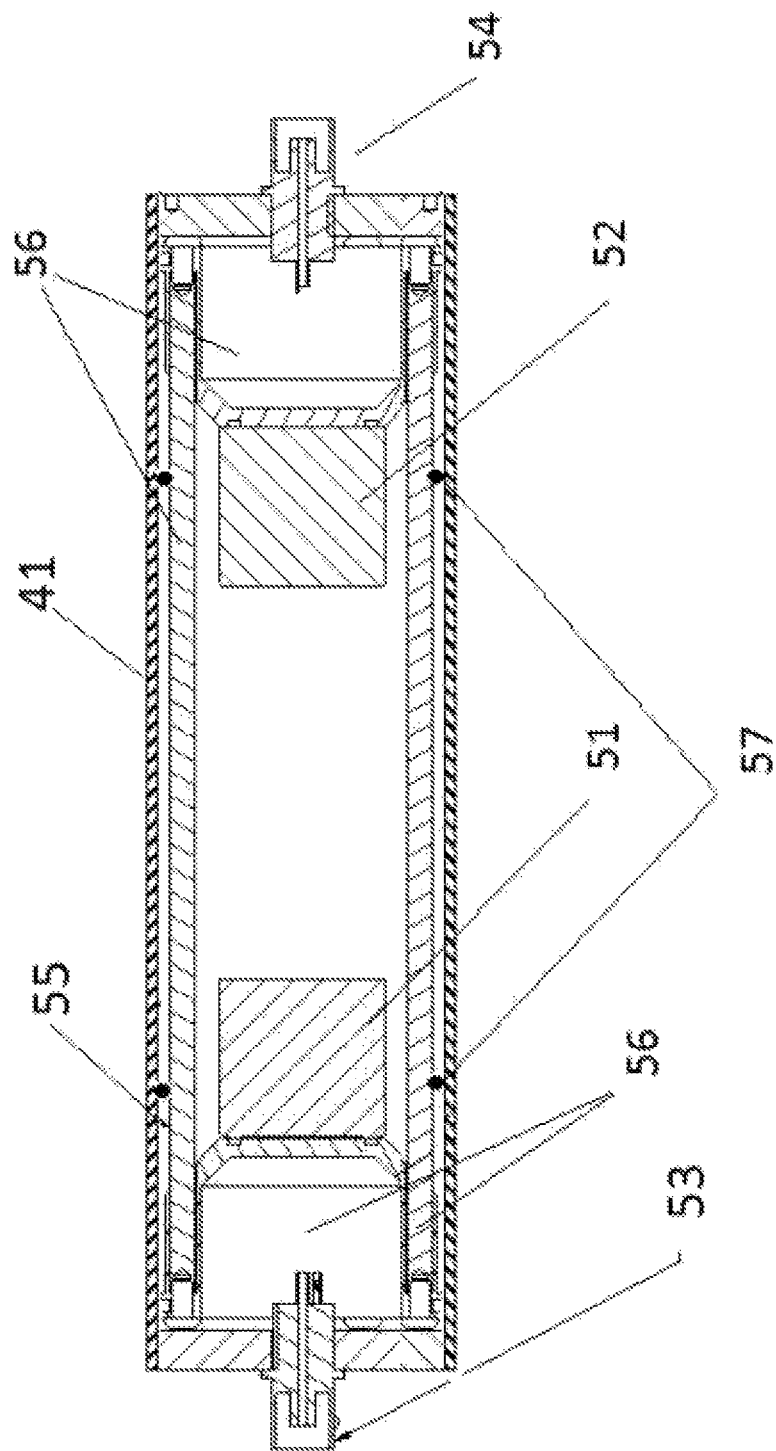
FIG. 8 is a schematic illustration showing a preferred embodiment of the sensor of FIG. 2 in which part of the body structure of the sensor is constructed of materials having different thermal expansion coefficients.

FIG. 8 is a schematic drawing showing a structure in which part of the body structure of the sensor is constructed of materials having different thermal expansion coefficients, so that the differential expansion of the materials compensates for changes in the thermal expansion and contraction of components of the sensor as the temperature of the transducers (51) and (52) changes. Transducers (51 and 52) are supported within the body structure (41) by respective supports (56), which are connected by connecting piece (55), in the form of a polyether ether ketone rod, to form a sub-structure which carries both transducers. The sub-structure is supported within the body of the sensor by a non-rigid attachment, in the embodiment shown, by O-rings (57), in order to isolate it from expansion of the sensor body.

Thermal expansion of the transducers (51), (52) tends to shorten the distance between the transducer faces, and thereby shorten the timing path length between the two faces.

Thermal expansion of the connecting rod (55) connecting the transducer supports tends to lengthen the path length however, thereby compensating for the thermal expansion of the transducers.

The inner wall of the body (41) is lined with a sound absorbent material (47) to minimise the effect of reflections from the internal surfaces. The sound absorbent material may be, for example, glass fibre or carbon fibre mesh or cloth. In a particularly preferred embodiment a woven braided 2×2 twill biaxial carbon fibre fabric sleeve with a diameter of 40 mm, and a density of 420 $g/m^2$ may be employed.

A temperature sensor (48) is provided within the body (41) to enable accurate measurement of the temperature of the device (and gas flow), to within a precision of 1 milliKelvin (mK). In the embodiment illustrated in FIG. 1, the sensor is operated in a controlled temperature environment, at approximately ambient temperature (typically 25° C.). The sensor may however be utilised in other situations in which a temperature-controlled environment is not available. For use in such an application, a heating element and temperature control equipment may be provided around or within the sensor, so as to enable the sensor to operate at a constant (fixed) elevated temperature. For example, the sensor may operate at a temperature of, for example, 30° C., 35° C., or 40° C. An advantage of this mode of operation is that the instrument needs to be calibrated at only one known temperature, in order to determine the length of the path for the ultrasonic sensor (9). Operation at constant temperature also has the effect of decreasing effects due to the thermal expansion/contraction.

As noted above, in a further preferred embodiment, further temperature compensation may be provided by applying an electronic correction to the length of the timing path, to compensate for the effects of thermal expansion or contraction of the sensor components. By way of example of this embodiment, the thermal expansion characteristics of the ultrasonic sensor (9) may be determined by measuring the transit time for ultrasonic waves using an inert gas such as argon at a series of temperatures, typically from 5 to 85° C. For argon, the speed of sound as a function of temperature is well known. This enables an accurate calculation to be made of the expansion characteristics of the timing path length with temperature. Variation in the transit time of the ultrasonic wave due to temperature variations can be separated into two components, i.e., a first component associated with the variation in the speed of sound for argon with temperature, and a second component, due to expansion or contraction in the path length. Such a calibration curve is shown in FIG. 9. The calibration curve may be stored in a computer memory, either as a lookup table or as coefficients of a polynomial expansion. Once the calibration curve has been obtained, it can be used in association with a temperature sensor to obtain a very accurate value for the length of the timing path, under the conditions of measurement.

The apparatus preferably includes a pressure measurement device, for determining atmospheric pressure, so that compensation can be applied for the variation of the speed of sound with pressure, if necessary. Provided that atmospheric pressure changes are relatively small, this effect is not normally significant, but the effect increases when the device is operated at high altitude, for example over 2,000 metres.

In one (not preferred) embodiment, an ultrasonic pulse is transmitted by transducer (51), and immediately detected by transducer (52) acting as a receiver. A timing path is defined simply as the distance between sensors (51) and (52). Such an embodiment is shown in the upper figure of FIG. 3, and is referred to herein as a "pitch-catch" configuration.

In the embodiment shown, speed of sound in the gas may be measured after a single transit through the gas flow path of a wavepulse, from ultrasonic transducer (51) to transducer (52). This embodiment may be described as a "pitch/catch" configuration. The measuring device is configured to measure the transmission time of a pulse from transducer (51), and its arrival time at transducer (52), and thereby determined the transit time of the pulse through the medium and thereby the speed of sound through the medium.

Figure 5:
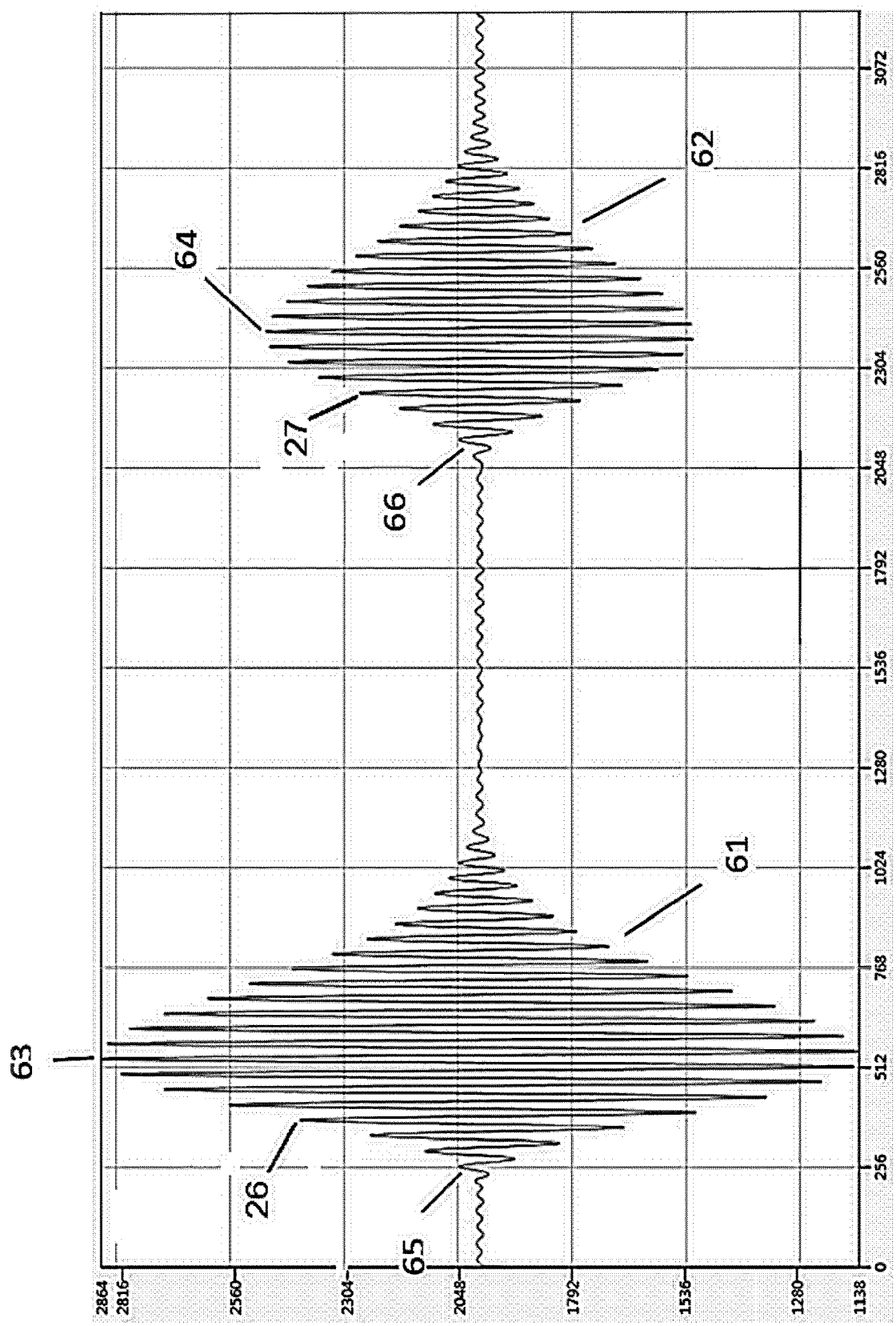
FIG. 5 illustrates a distorted wave form as received in the sensor of FIG. 2, when operated in the "pitch catch catch" operation mode.
Figure 6:
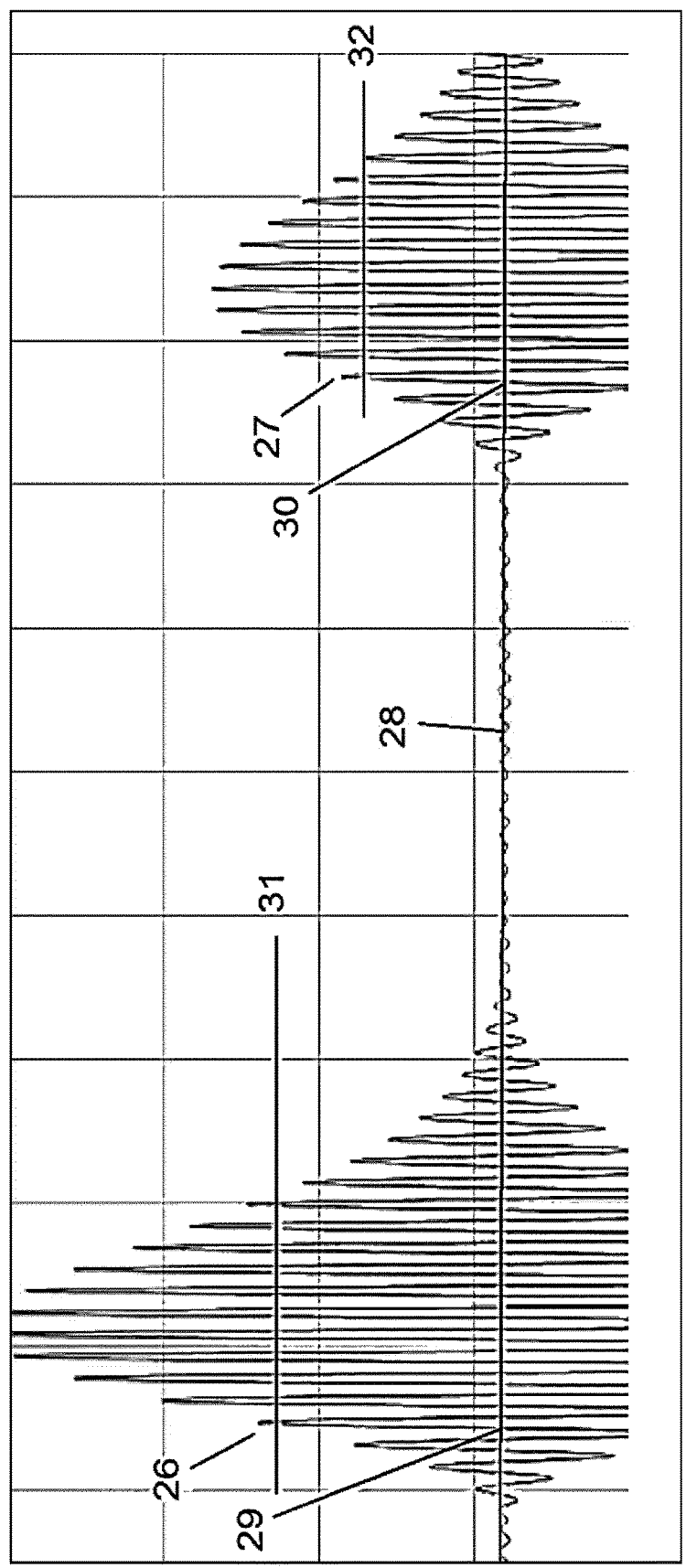
FIG. 6 is a magnified view of the first pulse of FIG. 5, showing the zero-crossing point of a half-height pulse.

In an alternative, a preferred embodiment, a "pitch/catch/catch" mode of operation is used, as illustrated in the lower figure of FIG. 3, and in FIGS. 5 and 6. In this mode of operation, a wave pulse is again transmitted by transducer (51) but transducer (52) is configured to detect not only the directly transmitted pulse (61), but also a reflected pulse 62. Pulse (62) is reflected from the face of both transmitters (52 and 51) (as illustrated in the lower part of FIG. 3). This configuration provides an increased path length and thereby increased sensitivity. It also has the additional operational advantage in that only the receiver transducer (52) needs be connected to the processing unit, and the precise timing for the initial transmitted pulse does not need to be known.

Transducers (51) and (52) may have a high q value (for example, from 30 to 40), which results in a high signal amplitude in the reflected and transmitted ultrasonic signal.

Alternatively, transducers (51) and (52) may have a low q value (for example, from 2 to 6, preferably from 3 to 4), which results can improve the accuracy and consistency of the waveform in the reflected and transmitted ultrasonic signal.

In its simplest embodiment, the transit time of the wave pulse along the timing path may be determined simply by measuring the time between two wavefronts, or two wave maxima, for example by the "pitch-catch-catch" method shown in FIG. 3. As mentioned above however, significantly better precision and reliability can be achieved by measuring the time interval between specific corresponding zero crossing points in the pulse stream before and after transit through the timing path.

Figure 4:
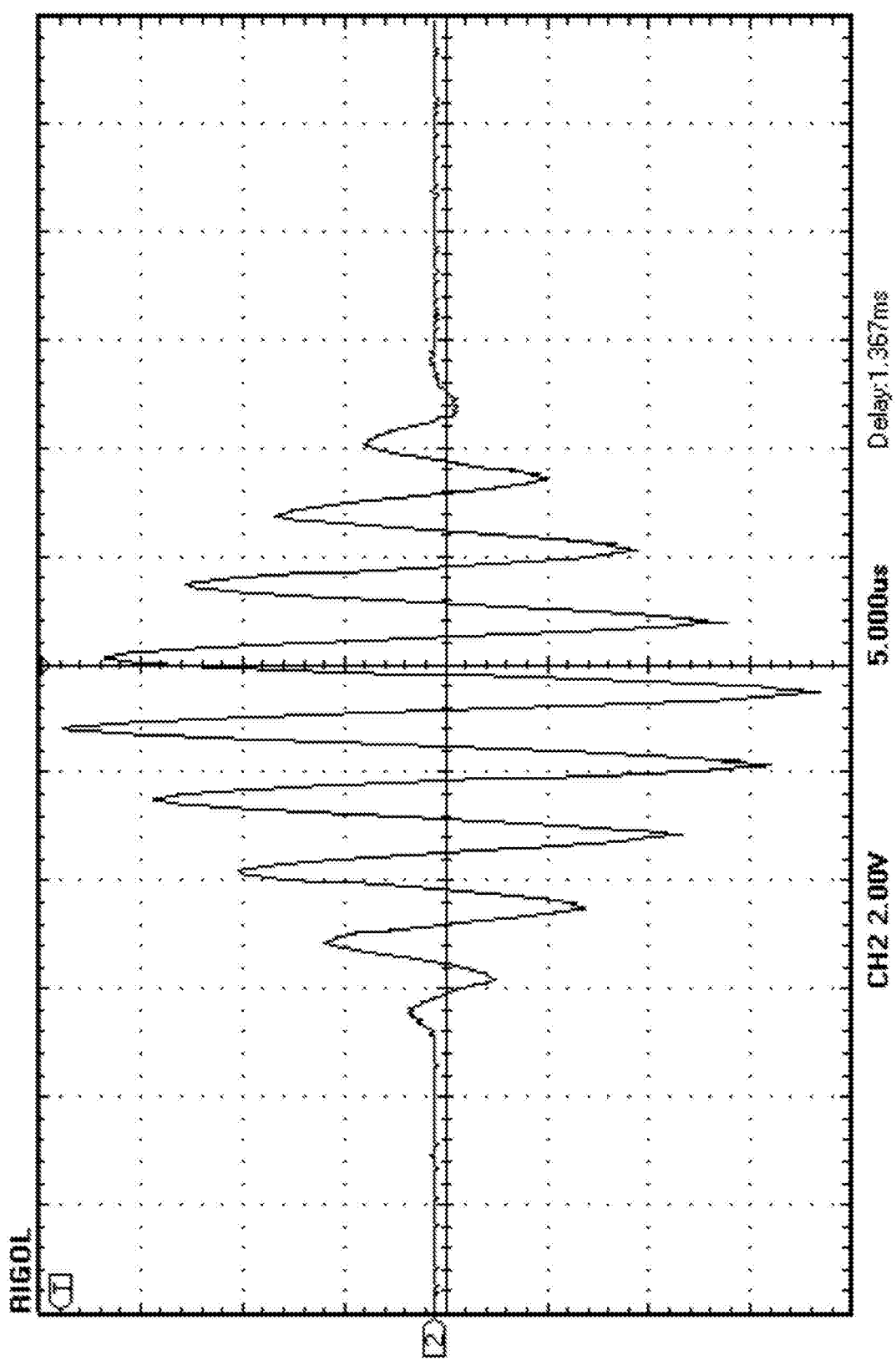
FIG. 4 is a schematic diagram of an undistorted ultrasonic wave pulse.

This aspect of the invention is illustrated in FIGS. 4 and 5 of the attached drawings. FIG. 4 illustrates a computer-generated ultrasonic wave pulse of approximately 9 cycles, (x value represents time and y represents amplitude), consisting of an envelope of peaks, constructed from a table of values. The pulse is fed to a digital to analogue converter (DAC), and filtered before being fed to ultrasonic transducer (51), so that the ultrasonic sensor (9) produces a constant frequency waveform pulse. The ADC samples at approximately 32 times the fundamental signal frequency, so that each cycle is made up of at least 32 data points.

FIG. 5 shows the corresponding pulse waveforms received by transducer (52). It can be seen that the number of cycles in the pulse waveforms has increased from nine in FIG. 4, to more than twenty in the first incident pulse (61) in FIG. 5. This increase is due to resonances within the transducer (51). The waveform of FIG. 5 consists of a first incident pulse (61) measured on entry into the timing path, and a twice-reflected pulse (62) measured on exit from the timing path. In this example, the length of the timing path is 2× the distance between transducers (51) and (52). Because of instrument-introduced resonances each pulse (61, 62) now contains 22 cycles (i.e., has 22 maxima), with a maximum amplitude (63, 64) at cycle No. 8. Thus eight cycles appear on the rising edge (i.e., before the pulse maximum 63, 64) and 16 cycles on the falling edge (after the pulse maximum 63, 64). Since both the receiving and transmitting transducers will inevitably introduce some distortion into the signal, the preferred method of measurement does not depend on the pulse shape, but rather on selecting a particular maximum from the pulse train. The pulses are sensed with an analogue to digital converter, which detects the cycle (61) with maximum amplitude in pulse (63) and the cycle (62) with maximum amplitude in pulse (64), as well as the cycle (65) with smallest amplitude in pulse 61, and cycle (66) with smallest amplitude of pulse (62).

After the extrema of each pulse has been measured, the position is detected of the cycle within each pulse of which the amplitude most closely approximates to a selected fraction (in the example given, half) of the amplitude of the maximum cycle amplitudes (63) and (64) respectively as approximated by lines (31) and (32) shown in FIG. 6. For the first cycle this corresponds to (26), the peak with an associated crossing time T1. For the second cycle this corresponds to (27), the peak with an associated crossing time T2.

Thus, the position is determined of pulse (67) with an amplitude most closely approximating to midway between pulses (63) and (65), and corresponding pulse (68) midway between cycles (64) and (66).

From the 50% height cycle maxima (26) and (27), the previous forward zero crossing point of the waveform is determined, by indexing back through ADC samples, until one sample lies on or above zero line, and one on or below it. This is illustrated in more detail in FIG. 6. The zero crossing point for cycle 1 (29 in FIG. 5) is then interpolated using these two samples to determine the entry time T1 of the pulse into the timing path, and the second zero crossing point for cycle 2 (30 in FIG. 5) is then interpolated to give the exit time of T2. The transit time is then determined as the difference between T1 (29) and T2 (30) (i.e., the difference between the two zero crossing points).

Having established the cycle correlation between pulses (61) and (62), the time difference between other cycles within pulses can also be measured from the crossing times, and all of these values then averaged, in order to improve measurement precision and/or accuracy.

Measurements are repeated at a rate of approximately 100 or more per second, thereby increasing statistical precision and/or accuracy by a factor of 10 or more. By this combination of steps, it is possible to obtain an precision and/or accuracy of typically around 1 part in 300,000 or better, for the measurement of time of passage of the wave pulse along the timing path.

The composition of the gas can thereafter be determined by comparison of the measured time of passage value with a calibration curve, produced using gases of known composition. In one embodiment, the calibration curve may be implemented as a simple "lookup" table stored in computer memory. In a preferred embodiment however, the calibration curve can be stored as the coefficients of a polynomial expansion. This approach enables a significant saving in the amount of data that needs to be stored for each solvent, and provides a surprising high degree of accuracy, typically 0.05 to 0.3%.

Although the method described above is concerned principally with measurement of speed of sound in order to determine gas composition, the "zero crossing" method described has other applications Ultrasonics are widely used for distance measurement in a wide range of industrial and commercial applications. One example is in the distance measurement sensors which are fitted to many automobiles. Such sensors generally provide only a low accuracy measurement over distances of many metres. They rely on a coarse measurement of time interval between transmission and receipt of an ultrasonic sound pulse. The use of a "zero crossing" measurement method of the kind described above enables such an ultrasonic sensor to measure distance to a precision of around 0.1 micrometers, over a distance of 50 mm.

The invention claimed is:

1. A method of measuring the transit time of an ultrasonic wave in a medium, comprising:
    passing an ultrasonic wave pulse through a timing path in the medium, the ultrasonic wave pulse including a plurality of cycles;
    receiving the ultrasonic wave pulse at the exit of the timing path;
    comparing a first signal representative of the ultrasonic wave pulse on entry to the timing path with a second signal representative of the ultrasonic wave pulse received at the exit of the timing path, the said first and second signals each including a plurality of cycles;
    thereby correlating at least one cycle of the first signal with a corresponding cycle of the second signal;
    determining a zero-crossing point associated with the said cycle of the first signal;
    determining a zero-crossing point associated with the said corresponding cycle of the second signal;
    measuring the time interval between the said zero crossing points;
    and thereby determining the transit time of the ultrasonic wave through the medium,
    wherein the said at least one cycle of the first and second signals is selected to be one with an amplitude which most closely approximates to a selected fraction of the maximum amplitude of the corresponding wave pulse.

2. A method according to claim 1, wherein the cycle that is selected is the one with an amplitude closest to a fraction selected from the group consisting of three quarters, two thirds, and one third of the maximum pulse amplitude.

3. A method according to claim 1, wherein the selected fraction of the maximum amplitude of the wave pulse is one half of the said value.

4. A method according to claim 3, wherein the zero-crossing point is a zero-crossing point immediately preceding the said cycle.

5. A method according to claim 1, and including the step of correlating at least one further cycle of the first signal with a corresponding cycle of the second signal, by measuring the time difference between the first said cycle and the said at least one other cycle in each of the first and second signal,
    thereby measuring the time interval between a zero crossing point associated with the said at least one further cycle of the first signal and a corresponding zero crossing points associated with the said at least one further cycle of the second signal, to obtain at least one further value for the transit time of the ultrasonic wave through the medium, and averaging the values obtained for the transit time of the ultrasonic wave through the medium in order to improve measurement precision.

6. A sensor for measuring the transit time of an ultrasonic wave in a medium, comprising:
    at least one ultrasonic transducer for creating an ultrasonic wave pulse through a timing path in the medium, and receiving the ultrasonic wave pulse after passage through the timing path, wherein the ultrasonic wave pulse includes a plurality of cycles;
    means for comparing a first signal representative of the ultrasonic wave pulse on entry to the timing path with a second signal representative of the ultrasonic wave pulse received at the exit of the timing path, the said first and second signals each including a plurality of cycles, and for thereby correlating at least one cycle of the first signal with a corresponding cycle of the second signal, wherein the said at least one cycle of the first and second signals is selected to be one with an amplitude which most closely approximates to a selected fraction of the maximum amplitude of the corresponding wave pulse;
    means for determining a zero-crossing point associated with the said cycle of the first signal and a zero-crossing point associated with the said corresponding cycle of the second signal;
    and for measuring the time interval between the said zero crossing points, thereby to determine the transit time of the ultrasonic wave through the medium.

7. Apparatus for investigating vapor sorption by a substrate, comprising:
    a sample housing location, for receiving the substrate under investigation;
    a gas-generating device for generating a gas mixture having at least two components;
    a gas handling system, for causing the gas mixture to flow over the substrate in the sample housing location, and
    a detector, for measuring sorption of components of the gas mixture by the substrate; and a sensor for measuring the composition of a gas mixture, wherein the sensor is a sensor in accordance with claim 6.

8. A device for investigating sorption of components of a multi-component gas mixture by a substrate, comprising:
    a sample housing location, for receiving the substrate under investigation;
    a mixing device for generating a mixture of a carrier gas with each of a plurality selected gaseous and/or vapour components, such that the resulting mixture has a desired composition;

a gas handling system, for selectively causing selected said mixtures to flow over the substrate in the sample housing location, wherein the mixing device is adapted to selectively create; (I) an individual mixture of each said component of the desired multi-component gas mixture with the carrier gas, and (II) a combined mixture including all of the said components of the desired multi-component gas mixture;

a gravimetric detector, for determining the weight change of the substrate in the sample location as a result of sorption by the substrate of components of the said gas mixtures; a spectroscopic analyzer for measuring a change in a spectroscopic property of the substrate in the sample location as a result of sorption by the substrate of components of the said gas mixtures;

means for generating an individual correlation between the said weight change and the said change in a spectroscopic property for each said individual mixture;

and means for measuring the said spectroscopic property of the said combined mixture, and for comparing a result obtained in the said measurement with the said individual correlations, and thereby determining sorption properties of the substrate of said components of the combined mixture.

9. A device according to claim 8 wherein the spectroscopic analyser comprises an infrared, near infrared or a Raman spectrometer.

10. A sensor according to claim 9, wherein the container has an inner wall, and the sensor includes an ultrasound-absorbent material positioned to reduce ultrasound reflection from the inner wall.

11. A sensor for measuring the composition of a gas, comprising a body structure defining a flowpath for a gas to be measured;

at least one ultrasonic transducer for creating an ultrasonic wave along a timing path located within the gas flowpath means for measuring the transit time of the ultrasonic wave along the timing path in the flowpath;

wherein the body structure includes a circular wall portion surrounding the said timing path, wherein the gas flowpath includes a temperature equilibration conduit extending for a plurality of revolutions around the said wall in thermal contact therewith, and wherein the arrangement is such that gas to be measured is caused to first flow through the temperature equilibration conduit before being caused to flow along the timing path, whereby the temperature of the gas flowing in the temperature equilibration conduit is equilibrated to that of the said wall, before the speed of the ultrasonic wave is measured.

12. A sensor according to claim 11, wherein the temperature equilibration conduit is embedded in the said wall.

13. A sensor for measuring the composition of a gas, comprising a body structure defining a flowpath for a gas to be measured;

means for measuring the temperature of gas flowing in the flowpath;

at least one ultrasonic transducer for creating an ultrasonic wave in a gas flowing in the flowpath and receiving the ultrasonic wave after passage through the gas;

wherein said at least one ultrasonic transducer is located within said body structure so as to define a timing path through the gas for the ultrasonic wave;

and a processing unit for determining the composition of the gas, based on the speed of passage of the wave along the timing path through the gas;

wherein the said body structure is constructed of at least two different materials having different thermal expansion coefficients, and wherein the construction of the sensor is such that the differential expansion of the said materials compensates for thermal expansion and contraction of components of the sensor, which would otherwise cause changes in the length of the timing path.

14. Apparatus for investigating vapor absorption by a substrate, comprising:

a sample housing location, for receiving the substrate under investigation;

a gas-generating device for generating a gas mixture having at least two components;

a gas handling system, for causing the gas mixture to flow over the substrate in the sample housing location, and a detector, for measuring sorption of components of the gas mixture by the substrate;

wherein the apparatus includes a sensor for measuring the composition of a gas, comprising a body structure defining a flowpath for a gas to be measured;

at least two ultrasonic transducers positioned adjacent the flowpath for creating an ultrasonic wave along a timing path between the transducers, in a gas flowing in the flowpath;

and a processing unit for measuring the speed of passage of the wave along the timing path through the gas, and thereby determining the composition and the mass transport velocity of the gas.

* * * * *